Oct. 13, 1931.  H. M. SPENCER  1,827,490
BAND SAW
Filed May 27, 1930
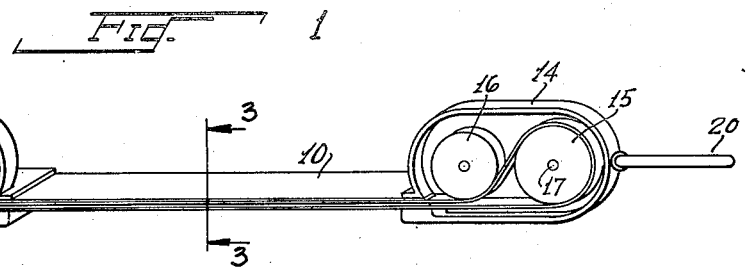
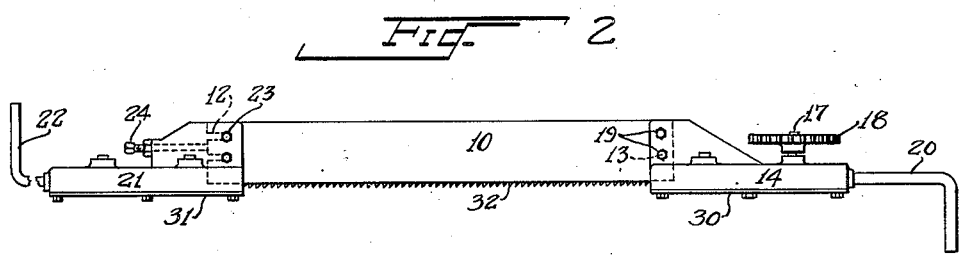
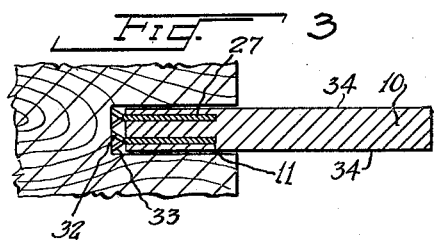
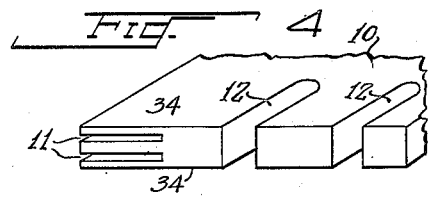
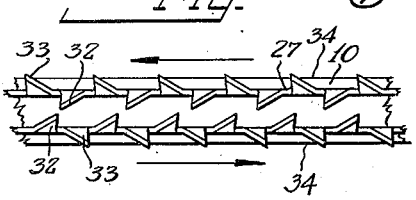
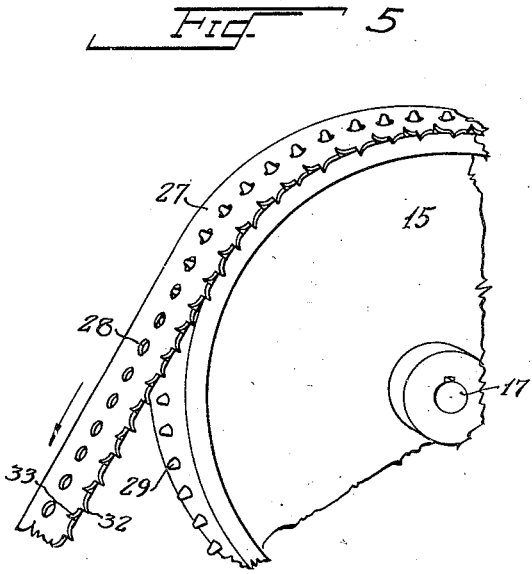
INVENTOR
H. M. SPENCER
ATTORNEY Patented Oct. 13, 1931

1,827,490

UNITED STATES PATENT OFFICE

HAROLD M. SPENCER, OF CRESCENT CITY, CALIFORNIA

BAND SAW

Application filed May 27, 1930. Serial No. 456,026.

This invention relates generally to saws, and particularly to band saws.

The main object of this invention is the provision of a band saw which can be used in the same manner as an ordinary stiff or straight saw.

The second object is the provision of a saw which will overcome the tendency of the saw to carry the work in the direction which the saw is moving.

The third object is to make it possible to employ the advantages of a band saw in connection with portable devices without necessitating the use of a large frame or the twisting of the band to take care of the return run of the saw.

The fourth object is to so construct the band saw that the two runs of the band will oppose each other for the purpose of overcoming the pulling action of the saw, and also for the purpose of providing a better cutting action.

These, and other objects, will become more apparent from the specification following as illustrated in the accompanying drawings, in which:

Figure 1 is a perspective view of the saw.

Figure 2 is a plan of Fig. 1.

Figure 3 is a section taken along the line 3—3 in Fig. 1.

Figure 4 is a perspective view of one end of the frame showing the saw slots.

Figure 5 is a fragmentary view of a drive wheel and a saw band.

Figure 6 is a side elevation of the cutting portions of the saw.

Similar numbers of reference refer to similar parts throughout the several views.

Referring in detail to the drawings, while it will be understood that this invention may take many different forms, depending upon the character of the work which is to be performed, I have chosen to illustrate it in connection with a simple frame 10 of elongated shape having formed in one end thereof the saw slots 11. On one end of the frame 10 are provided the slots 12 and at its opposite end the holes 13.

To the end of the frame 10 having the holes 13 is bolted a housing 14 within which are mounted the driving wheel 15 and the idler wheel 16. The driving wheel 15 is mounted on the shaft 17 on which is secured a gear 18, or any other convenient means of supplying power to the shaft 17. The precise nature of the means for supplying this power is immaterial. The housing 14 is secured to the frame 10 by means of the bolts 19. A handle 20 of any convenient shape is attached to the housing 14.

At the opposite end of the frame 10 is secured a second housing 21 provided with a handle 22 and secured to the frame 10 by means of the bolts 23 which pass through the slots 12. An adjusting screw 24 on the housing 21 bears against the end of the frame 10. Within the housing 21 are the wheels 25 and 26, both of which operate as idlers although either could be driven should same be desired.

Turning now to the saw 27 itself it will be seen to be similar to the ordinary band saw except that it is provided with a plurality of perforations 28 adapted to receive the teeth 29 which project from the drive wheel 15 and from the wheel 25. The function of these teeth is to provide the proper driving relation, and also to prevent the saw 27 from coming off of the wheel 25.

Over the open side of the housings 14 and 21 are placed the cover plates 30 and 31.

It will be noted that the spacing of the slots 11 is only sufficient to permit the teeth 32 of the oppositely running portions of the saw 27 to clear each other, the purpose being to make as little kerf as possible. The outermost toothed portions 33 must of course project past the sides 34 of the frame 10 to give it the necessary clearance in the cut.

As previously stated, many different forms of frames and driving mechanisms may be employed in the construction of this device; I therefore do not wish to limit myself to the particular form shown in the drawings, but I do intend to cover all such forms and modifications thereof as fall fairly within the appended claims.

I claim:

1. A band saw consisting of an elongated double raceway, a pair of sheaves mounted at each end of said raceway, one side of each sheave lying tangent to its respective raceway, one sheave of each pair having saw-engaging teeth projecting therefrom, and a perforated band saw passing around said toothed sheaves and through said raceways, the teeth on said band saw having uniform set on both sides thereof.

2. A band saw consisting of an elongated double raceway, a pair of sheaves mounted on each end of said raceway, one side of each sheave lying tangent to its respective raceway, one sheave of each pair having saw-engaging teeth projecting therefrom, a perforated band saw passing around said toothed sheaves and through said raceways, the teeth on said band saw having uniform set on both sides thereof, and means for increasing the tension on said band saw.

HAROLD M. SPENCER.